J. T. JONES.
METHOD OF TREATING ORE.
APPLICATION FILED APR. 11, 1908.
899,405.
Patented Sept. 22, 1908.
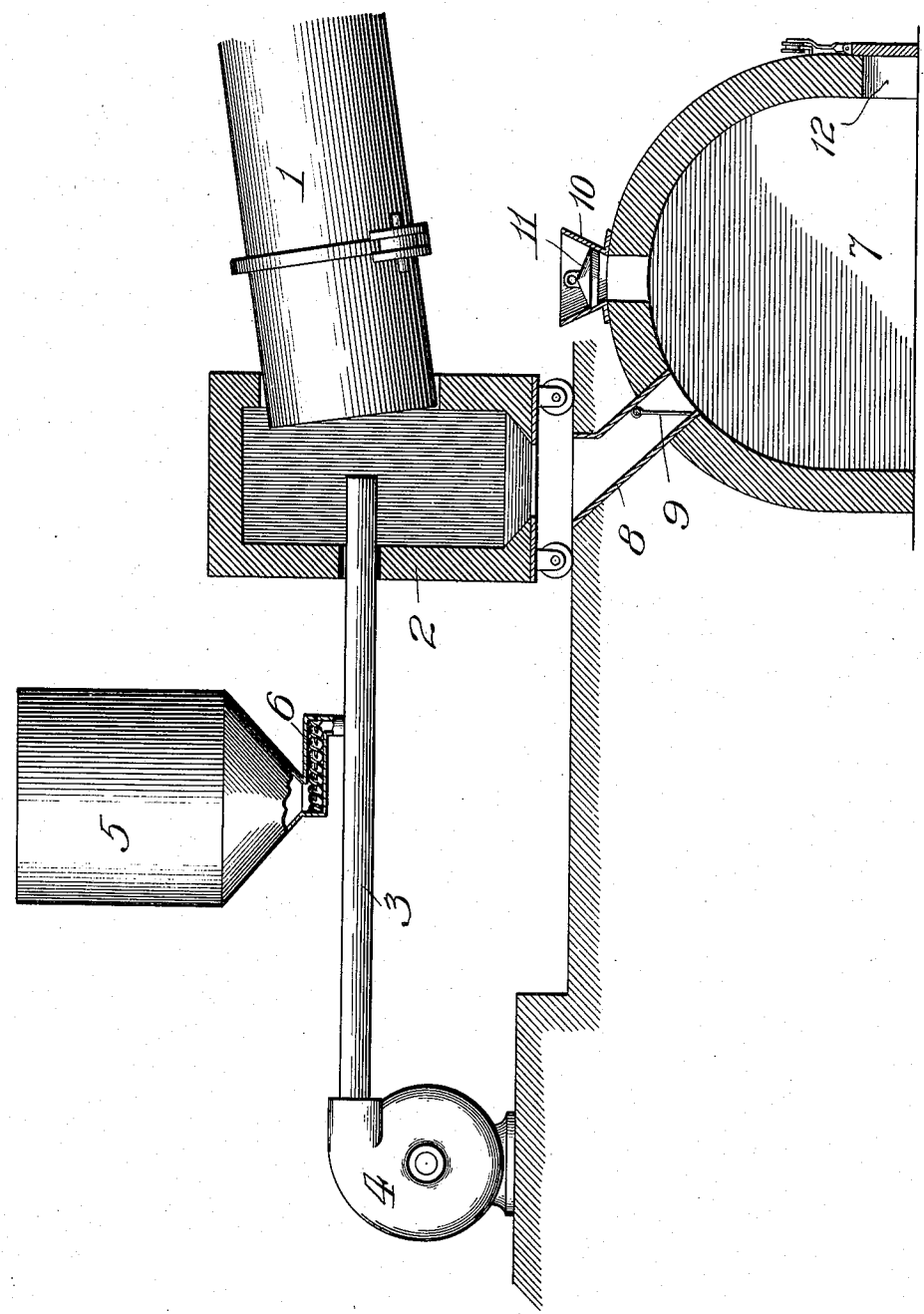
Witnesses:
John Enders
Chas H Buell
Inventor:
John T. Jones,
By Dyrenforth, Lee, Chritton & Wiles

UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF TREATING ORE.

No. 899,405.　　　Specification of Letters Patent.　　　Patented Sept. 22, 1908.

Application filed April 11, 1908. Serial No. 426,453.

*To all whom it may concern:*

Be it known that I, JOHN T. JONES, a citizen of the United States, residing at Iron Mountain, in the county of Dickinson and State of Michigan, have invented a new and useful Improvement in Methods of Treating Ore, of which the following is a specification.

My object is to provide a simple and improved method of treating iron, or other, ore for the purpose of reducing the oxids to metal and putting the ore into the condition of "sponge", preparatory for further treatment to extract or refine and save the metal.

In carrying out my invention I subject a mass of ore to a high temperature in an oxidizing atmosphere for the purpose of heating it throughout and incidentally roasting off any sulfur contents, the object being, more especially, to raise the temperature of the mass well above that necessary to cause deoxidation of the metallic oxids when subjected to a reducing atmosphere. After the temperature of the ore has been raised to the required degree I charge the mass into a suitable receptacle, which may be, or operate as, a soaking pit. The pit may contain a bed of, preferably, pulverized bituminous coal, or the coal may be charged with the ore into the pit. Here the stored heat from the ore will operate to distil off the volatiles of the fuel and cause them to react upon the ore and deoxidize its metallic oxids. The mass may remain in the pit until it cools below the temperature at which the reducing action will continue or, in fact, until it is cool enough for ready handling.

The results obtained by the practice of this method will be governed, largely, by the temperature of the ore when charged into the pit. Under proper conditions a mass of ore should become quite thoroughly reduced and sufficiently cool after being in the soaking pit say from five to twelve hours.

My invention is particularly well adapted for the economical reduction of oxid of iron ores, and in the accompanying drawing I illustrate, by a broken sectional view, apparatus which may be employed to practice the steps of my method for the production of what may be characterized as iron "sponge".

The drawing shows a furnace of a type commonly employed for burning cement, 1 being an inclined rotary kiln, say one hundred or more feet in length, 2 a movable fire-box fitting over the lower end of the kiln, 3 a blast tube extending from an air blower 4, and 5 a storage hopper for pulverized coal. The coal is fed by a conveyer 6 from the hopper into the blast tube, and is blown into the lower end of the kiln where it is ignited. As the construction and operation of a furnace of this type are well known, a more detailed description and illustration thereof in this connection is thought to be unnecessary. The ore to be heated is fed into the upper end of the kiln and in the rotation of the latter is moved slowly to the lower end whence it is discharged. The temperature to which the ore is subjected before leaving the kiln should be high enough to heat the mass throughout to a degree below that necessary to melt any of its constituents but well above that necessary to deoxidize the metallic oxids in the presence of a reducing atmosphere. In other words, if, for example, the melting temperature of the slag making constituents is 2200° F. I would heat the mass to a temperature between 1470° F. and 2000° F. As the ore moves through the kiln any sulfur contents will be more or less thoroughly eliminated.

7 represents an approximately air-tight chamber or soaking pit having a chute 8 in its top, which may be in position to receive the ore discharged from the kiln 1 and direct it into the pit. A swinging valve 9 in the chute will permit the ore to slide into the pit and prevent the escape of gas therefrom to any material extent. Also at the top of the pit is a coal-hopper 10 fitted with a bell valve 11.

As the hot ore is discharged from the kiln 1 it falls into the pit without material loss of temperature. Initially a layer of bituminous coal dust may be spread over the bottom of the pit and as the ore accumulates thereon the heat of the ore will distil the volatile hydro-carbons out of the coal and thus generate reducing gases which will immediately react upon the hot ore to rob it of its oxygen. As the ore accumulates in the pit more coal may be added from time to time through the hopper 10. The ore will cool very slowly in the pit because of its confinement and because a certain amount of heat will of course be generated by the chemical reactions. If the ore enters the pit at a temperature of say 2000° F. substantially all the metallic oxids will have been reduced before the temperature falls below say 1000° F., and under the conditions as I prefer to provide them it takes several hours for the mass to cool to that extent in the pit. When the reduced mass has cooled sufficiently it may be withdrawn through the opening 12, which, as shown, is provided with a door. After the treatment described the mass is of a spongy nature in the sense that the metal particles have, to a large extent, agglomerated into lumps of honeycomb form with the slag making constituents adhering thereto or incorporated therewith.

What I claim as new, and desire to secure by Letters Patent, is—

1. The method of reducing ore which consists in heating a mass thereof to a high temperature without melting it, then subjecting the heated mass, under confinement, to contact with fresh hydro-carbon fuel, distilling the fuel by the heat of the ore and thereby generating a deoxidizing atmosphere to react upon the ore and reduce metallic oxids to metal.

2. The method of desulfurizing and reducing ore which consists in subjecting a mass thereof to a highly heated oxidizing atmosphere to burn off sulfur and heat the mass to a high temperature without melting it, then subjecting the heated mass, under confinement, to contact with fresh hydro-carbon fuel, distilling the fuel by the heat of the ore and thereby generating a deoxidizing atmosphere to react upon the ore and reduce metallic oxids to metal.

JOHN T. JONES.

In presence of—
L. HEISLAR,
R. SCHAEFER.